EDWARD BOURNE.
Compression Cocks.

No. 125,532.  Patented April 9, 1872.

Witnesses:
Josiah W. Ells
N. B. Couch

Inventor:
E. Bourne 125,532

UNITED STATES PATENT OFFICE.

EDWARD BOURNE, OF PITTSBURG, PENNSYLVANIA.

IMPROVEMENT IN COMPRESSION-VALVES.

Specification forming part of Letters Patent No. 125,532, dated April 9, 1872.

SPECIFICATION.

*To all whom it may concern:*

Be it known that I, EDWARD BOURNE, of the city of Pittsburg, in the county of Allegheny and State of Pennsylvania, have invented a new and useful Improvement in those well-known contrivances used in mechanical enginery, denominated "Compression-Valves." In some of these the metallic face of the operative or movable part is ground onto and made to fit very closely the stationary part called the "seat," and in others a packing of some elastic substance is introduced between the two, the object in both cases being to obtain a tight joint.

The trouble in keeping the first-mentioned class of valves tight for any considerable length of time is great, owing to the fact that small particles of foreign substances often lodge and affix themselves to the face or seat of the valve, and either prevent its perfect closing or so cut and otherwise mutilate the parts as to occasion leakage; and, in those valves wherein a disk or pad of some elastic material is interposed between the closing parts, it is so acted on by pressure, the passing currents of water, steam, &c., to which it is exposed, as to soon change and destroy its primitive condition, so that in a very short time it fails to perform the part or purposes for which it was intended.

My invention consists in so securing the elastic pad, disk, or packing, used as above stated, as to prevent its abrasion by pressure, and disintegration, corrosion, and ultimate destruction by the passing liquids, steam, or gases to which it may be exposed; and this I accomplish by inclosing such elastic substance or pad in a very thin and flexible metallic capsule that, while it protects the parts from injury, will so yield with the elastic substance, on the application of pressure, as to conform to the inequalities of surface on the valve or its seat as to make a tight joint.

The mode of putting my invention into practice will be readily understood by the following description, taken in connection with the accompanying drawing, wherein—

Figure 1:
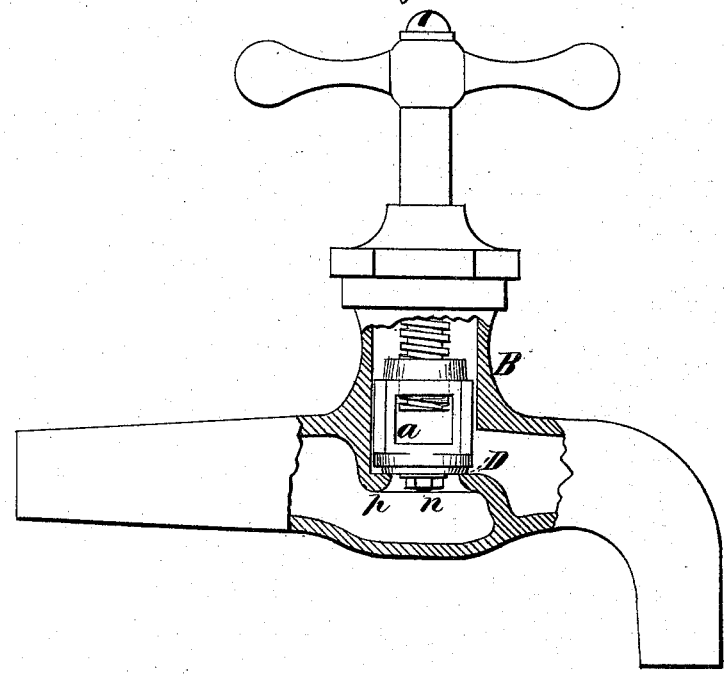
Figure 2:
Figure 3:
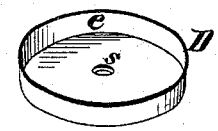
Figure 7:
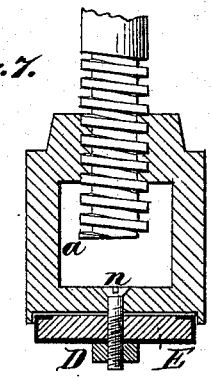
Figure 4:
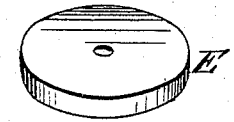
Figure 5:
Figure 6:
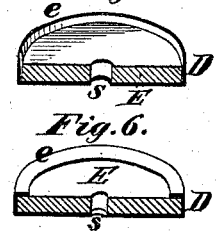

Figure 1 represents a side view of a compression-valve, having a portion of its case broken away to show the interior. Fig. 2 represents a circular plate of very thin flexible metal; Fig. 3, the same plate turned up at its edges to form a round shallow open box; Fig. 4, disk of India rubber; Fig. 5, transverse section of the thin metallic box, and the India-rubber disk placed therein. Fig. 6 represents the same, with the edges of the thin metallic box turned down and over its elastic filling. Fig. 7 represents an enlarged transverse vertical section of the movable parts of a valve, showing the application of my improvement.

I construct a compression-valve, $a$, and its case B, in any of the well-known ways, and of any convenient shape, and for any purpose necessary in the arts, and then prepare a plate, C, of very thin, pliable, and flexible metal, and, by means of a press and dies, or other means, turn up its edges so as to form a shallow, open, circular box, D, in diameter a little less than the face of the intended valve. A disk, E, of some elastic substance—preferably India rubber—of the same diameter as the inside of the box D, is then placed therein, and the projecting edges $e$ of the thin metal turned over and down on the elastic material inside, as indicated in Fig. 6. A small hole, $s$, is then or previously made through the center of this capsule and its inclosed substance, by which it may be readily secured to the face of the valve $a$, such face being recessed to a depth not exceeding half the thickness of the capsule D to receive it, wherein it may be confined by means of a small screw, $n$, passing through both, in the manner shown in Fig. 7, or by any other means found most desirable, and by which the objects of my invention will be attained, as hereinbefore mentioned, in a simple, cheap, and efficient form.

Although in this case the flexible capsule D, with its filling of elastic material, is applied directly to the movable portion of the valve so as to travel with it, still the same results will follow by having an annular elastic body inclosed in very thin metal, and seated in a circular channel cut around the valve-seat $p$. Therefore, I do not limit myself to the peculiar construction of parts, as these may be varied while the spirit of my invention remains the same.

*Claim.*

I claim—

Facing, inclosing, or otherwise protecting the elastic pad, packing material, or substance interposed between a compression-valve and its seat by means of a thin, flexible, metallic plate, box, covering, or envelope, for the purposes hereinbefore stated, substantially as described.

E. BOURNE.

Witnesses:
 JOSIAH W. ELLS,
 N. B. COUCH.